United States Patent

[11] 3,611,188

[72] Inventors Elias Snitzer
Wellesley, Mass.;
Richard F. Woodcock, South Woodstock, Conn.
[21] Appl. No. 825,765
[22] Filed May 19, 1969
[45] Patented Oct. 5, 1971
[73] Assignee American Optical Corporation
Southbridge, Mass.

[54] YTTERBIUM LASER DEVICE
6 Claims, 6 Drawing Figs.

[52] U.S. Cl. ........................................... 331/94.5, 252/301.4
[51] Int. Cl. ........................................... H01s 1/09, H01s 1/02, H01s 3/16
[50] Field of Search ................................ 331/94.5; 252/301.4

[56] References Cited
UNITED STATES PATENTS
3,270,291  8/1966  Kosonocky ................. 331/94.5
3,391,281  7/1968  Eerkens ........................ 331/94.5
3,487,330  12/1969  Gudmundsen ............... 331/94.5

FOREIGN PATENTS
673,401  12/1965  Belgium ...................... 331/94.5

OTHER REFERENCES

Snitzer et al., " Saturable Absorbtion of Color Centers in Nd 3+—Nd 3+—Yb $^{3+}$ Laser Glass," IEEEJ. Quoatum Electronics, QB-2, (9), Sept. 1966 pp. 627– 32

Vuylsteke et al., " Glass Laser Technology," Laser Focus, December 1967, pp. 21– 29.

Snitzer, "Laser Emission at 1.06u from $Nd^{3+}$-$Yb^{3+}$ Glass." IEEEJ. of Quontum Electronics QE-2 Sept., 1966, pp. 562– 6.

Bonch-Bruevich et al., " Rectangular Rod Neodymium Glass Laser," Soviet Physics-Tech. Phys. 11, (7) Jan 1967, pp. 942– 4.

*Primary Examiner*—Ronald L. Wibert
*Assistant Examiner*—R. J. Webster
*Attorney*—Lane, Aitken, Dunner & Ziems ABSTRACT: $Yb^{3+}$ doped laser device which emits radiation at wavelengths shorter than 1.06 microns at high temperatures. The device includes a laser-active component doped with ytterbium ions and a sensitizer component proximately disposed in relationship to the laser-active component doped with neodymium ions.

PATENTED OCT 5 1971 3,611,188

INVENTORS
ELIAS SNITZER &
RICHARD F. WOODCOCK

BY Lane, Aitken, Dunner & Ziems
ATTORNEYS

PATENTED OCT 5 1971

INVENTORS
ELIAS SNITZER &
RICHARD F. WOODCOCK

BY Lane, Aitken, Dunner & Ziems
ATTORNEYS

YTTERBIUM LASER DEVICE

BACKGROUND OF THE INVENTION

The field of this invention is $Yb^{3+}$ doped laser devices. Doubly doped laser glasses containing ytterbium laser ions with neodymium sensitizers are known. However, in the known compositions laser emission occurs at 1.06 microns at room temperature and shifts to 1.015 microns at 77° K. The reason for the shift from 1.06 microns to 1.015 microns is that the gain coefficient at 1.015 microns is larger by approximately a factor of three than it is at 1.06 microns. The 1.015 micron emission from ytterbium is partially three level in character due to its location close to the ground state which is the band at 0.97 microns. At liquid nitrogen temperatures the higher gain coefficient at 1.015 microns leads to laser emission at this wavelength. At room temperature the partial three level character of the 1.015 micron line prevents laser emission until the inversion is sufficiently high so that the lower gain coefficient of 1.06 microns is sufficient to cause laser emission at the longer wavelength. Emission at the longer wavelength is further assisted by some residual population in the $Nd^{3+}$ ions which give an effective gain coefficient of both ions at 1.06 microns. This is a value which is larger than that for the ytterbium alone. Thus far the only devices known which exhibit 1.015 micron emission from ytterbium doped lasers must be cooled by liquid nitrogen to a temperature of approximately 77° K.

In order to prevent laser emission at 1.06 microns at room temperature, it is desirable to use relatively low concentrations of $Yb^{3+}$ (2 wt. percent of the oxide or less); however, with low concentrations of $Yb^{3+}$, the energy transfer from $Nd^{3+}$ to $Yb^{3+}$ becomes relatively less efficient with the result that the residual excited population of $Nd^{3+}$ together with the inverted population of $Yb^{3+}$ provides sufficient gain at 1.06 microns to give laser emission at this wavelength. The desirability of a relatively low concentration of $Yb^{3+}$ for emission at 1.015 microns and the pumping efficiency provided by the presence of $Nd^{3+}$ ions can be advantageously combined in accordance with the present invention wherein the laser configuration consists of a laser-active component doped with a relatively low concentration of $Yb^{3+}$ and a proximally disposed sensitizer component doped with $Nd^{3+}$ ions alone or $Nd^{3+}$ ions and $Yb^{3+}$ ions.

SUMMARY OF THE INVENTION

A ytterbium laser device is provided comprised of two components, a laser-active component containing ytterbium laser ions and a sensitizer component doped with trivalent neodymium ions or trivalent neodymium ions and trivalent ytterbium ions proximately disposed in relationship to the laser active component. The device produces laser emission from the ytterbium ion at wavelengths shorter than 1.06 microns at room temperature (approximately 22° C.) and at temperatures lower than room temperature.

Accordingly, it is an object of the present invention to provide a ytterbium doped laser in which the ytterbium ions will lase at wavelengths shorter than 1.06 microns at room temperature.

DESCRIPTION OF THE PREFERRED EMBODIMENTS

Figure 1:
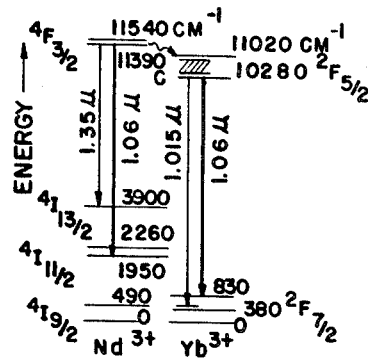
FIG. 1 is an energy level diagram for the neodymium-ytterbium energy transfer scheme.

Referring the drawing, FIG. 1 shows the energy transfer from trivalent neodymium to trivalent ytterbium. Trivalent ytterbium can be pumped by an energy source from an initial ground level designated as $^2F_{7/2}$ to an upper level designated as $^2F_{5/2}$. From the $^2F_{5/2}$ level of ytterbium laser action can occur in at least two wavelengths shown in FIG 1, that is 1.015 microns and 1.06 microns. In the prior art the selection of either of these two laser-emissive wavelengths was largely controlled by the temperature of the laser-active medium.

In order to increase absorption of the flash tube light, prior art materials have incorporated small amounts of neodymium in the ytterbium-doped host. Since trivalent ytterbium does not absorb all of the wavelengths emitted by conventional xenon flash tubes, neodymium is included to increase absorption and enhance the pumping efficiency. Unlike ytterbium, neodymium has absorption bands in the visible portion of the spectrum and is, therefore, able to absorb the light emitted by the flash tube in this portion of the spectrum. However, when neodymium is included as a sensitizer for ytterbium, the laser device emits at 1.06 microns at temperatures in the vicinity of room temperature.

Figure 2:
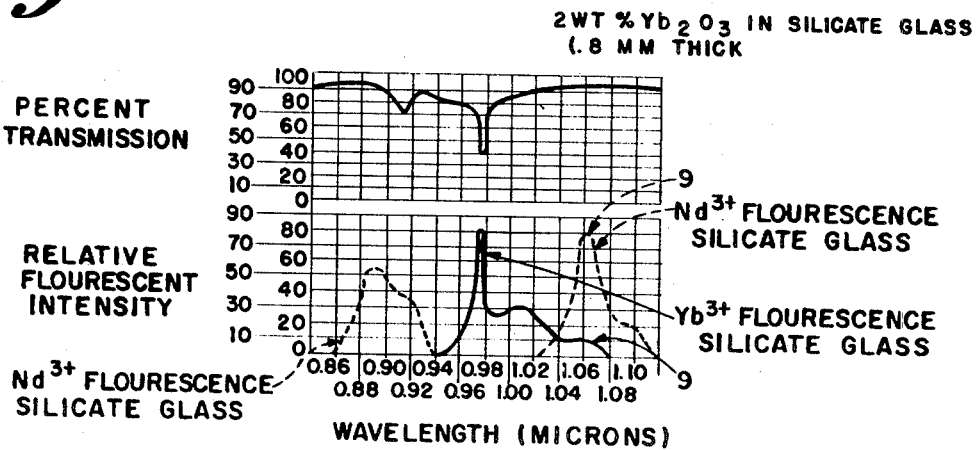
FIG. 2 is a plot of the fluorescent and absorption intensity spectra for ytterbium, and the fluorescent intensity spectrum for neodymium.

FIG. 2 shows the overlap of fluorescence of the neodymium and ytterbium at 1.06 microns at room temperature. As can be seen in FIG. 2 both $Nd^{3+}$ and $Yb^{3+}$ have fluorescent curves which have peaks indicated by reference numeral 9 which overlaps at 1.06 microns.

Since the $Yb^{3+}$ operates as a three-level system, the $Yb^{3+}$ concentration should be kept low. However, if the concentration is kept low some $Nd^{3+}$ ions tend to remain in an excited state. Thus with low $Yb^{3+}$ concentrations the transfer of energy from the neodymium to the ytterbium is incomplete. A reason for the emission from $Yb^{3+}$ at 1.06 microns at room temperature is the residual population inversion of Nd ions in combination with the excited ytterbium ions gives a gain coefficient which is affective to produce emission at 1.06 microns. This gain is larger than that for the ytterbium ions alone if the ytterbium ion concentration is low.

Figure 3:
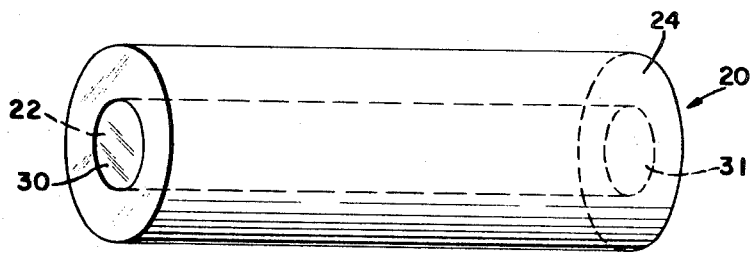
FIG. 3 is a perspective view showing one embodiment of the laser material of this invention.

FIG. 3 shows an embodiment of the laserable material of the present invention. Rod 20 is composed of laser active component 22 which is a core of rod 20 surrounded by cladding 24. In this embodiment, cladding 24 serves as a sensitizer component. Homogeneously distributed throughout core 22 are ytterbium ions. Ytterbium is doped within said core in laserable quantities. When used throughout the specification and claims, the term "laserable quantity" means a quantity of laser ions sufficient so that when a population inversion is established in the laser ions, a radiative transition from a selected energy level such as the $^2F_{5/2}$ levels to a lower level such as $^2F_{7/2}$ is possible. The laser ion is present in a concentration so that a sufficient inversion in population may be established between two energy levels so as to provide enough gain in the laser wavelength of stimulated emission to overcome all light losses within laserable core 22. Experimentally it has been determined that the concentration of ytterbium ions necessary for laser action is between the range of $10^{18}$ ions per cubic centimeter and $3\times10^{21}$ ions per cubic centimeter; expressed in a weight percent this would be approximately between the values of 0.01 –30 weight percent of the oxide of $Yb_2O_3$. Cladding 24 which serves as the sensitizer component is doped with a quantity of sensitizer ions. The sensitizer ions, that is the trivalent neodymium ions, are provided in a concentration sufficient to enable an energy transfer from the sensitizer to the laser ion. The ranges of laser and sensitizer ions are known and do not constitute a part of the invention. It is to be understood that the base glass may be of any material previously used in the glass laser art and includes silicates, phosphates, borates, borosilicates, arsenic trisulfide, selenides, teluides, fluorides, oxifluorides, alumino-silicates, germanates and organic glasses. The only controlling requirement for the glass base is that it be essentially transparent at the wavelengths at which ytterbium and neodymium absorb and transmit energy. Cladding 24 may be composed of the same glass base as core 22; however, the invention is not intended to be limited to this specific arrangement.

Figure 5:
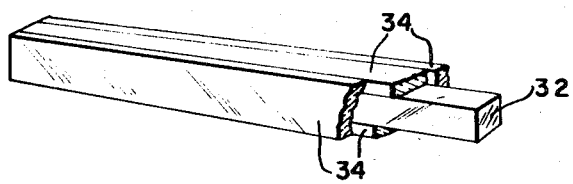
FIG. 5 is a perspective view partially in section showing a second embodiment of the laser material of this invention; and, FIG. 6 is a perspective view partially in section showing a third embodiment of the laser material of this invention.

FIG. 5 shows an alternate embodiment of the invention. In this embodiment, the laser material is comprised of a number of slabs of glass doped with active ions. In FIG. 5, slab 32 comprises the laser active component which is doped with ytterbium ions and is surrounded by one or more slabs 34 which slabs comprise sensitizer components, said sensitizer components being doped with neodymium ions. An advantage of this embodiment is the ratio of the size the sensitizer component and the laser active component can be easily varied. Also the material shown in FIG. 5 is easily constructed, since the slabs need not be fused together.

Figure 6:
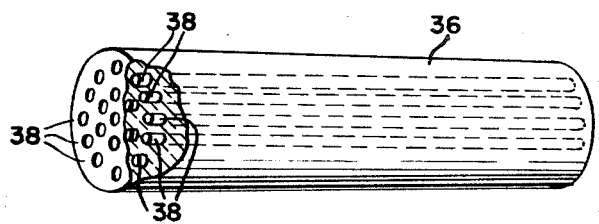

FIG. 6 shows another embodiment of the invention and in this embodiment the laser-active component indicated by 36 has formed therein sensitizer components in the form of optical fibers 38 longitudinally disposed throughout said laser active component. An advantage of this embodiment is that energy being transferred from the sensitizer component will be more efficiently absorbed by the laser active component that is the case with the embodiment shown in FIG. 3, since the sensitizer components are surrounded by the laser active component.

In all embodiments of the invention it is essential that the neodymium ions be present only in the sensitizer component and that the laser active component contain no neodymium ions. The simplest embodiment of the invention then resides in providing a laserable material with a sensitizer component proximately disposed in relationship to the laser active component and with the sensitizer component containing all the neodymium ions. Best results, however, are obtainable when the sensitizer component also contains some trivalent ytterbium ions. When ytterbium ions are present in the sensitizer component they transfer energy from the sensitizer component to the laser-active component. The useful range of ytterbium oxide in the sensitizer is between the values of approximately 0.1 to 55 weight percent.

Figure 4:
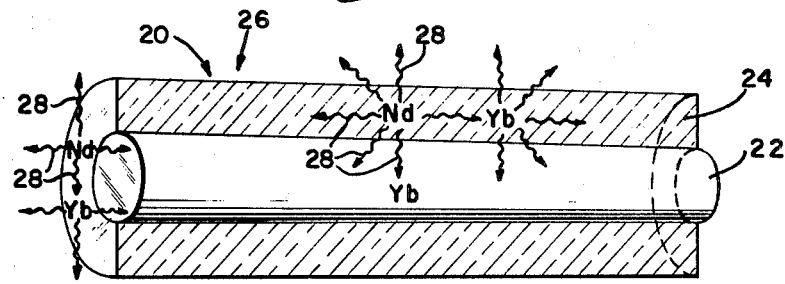
FIG. 4 is a perspective view partially in section of the laser material shown in FIG. 3 diagrammatically illustrating the transfer of FIG. 1.

Operation of the laser material can be understood by reference to FIG. 4. Light from a flash tube (not shown), enters rod 20 as is indicated by arrow 26 and excites ions along its path. It is to be understood that the light from the flashlamp not only excites ions in the sensitizer component, but also passes through such sensitizer components into the laser-active component and excites the active ions within said laser-active component. Neodymium ions within cladding 24 are excited by the flash tube to the $^4F_{3/2}$ level and transfer this energy to excite ytterbium ions both within the sensitizer component 24 and laser active component 22 to the $^2F_{5/2}$ level as is shown by wavy arrow 28. The ytterbium ions in sensitizer component 24 transfer energy the ytterbium ions within the laser-active components. Energy is also transferred directly from the neodymium ions in the sensitizer component to the ytterbium ions within the laser active component.

FIG. 4 shows possible energy patterns of the $^4F_{3/2}$ level of the neodymium and the $^2F_{5/2}$ level of the ytterbium ions within cladding 24 and core 22. As is shown by the arrows in FIG. 4, some of the energy is transferred in an inward direction and is absorbed by the active laser ions within core 22, and some of the energy travels outward and is lost. Some of this lost energy can be reflected by the silver foil (not shown) used to couple flash tube light to the laser rod and can be recaptured. Also exterior of cladding 24 can be provided with a ground finish, which can scatter light back into the rod.

The laserable material of the present invention is intended for utilization in laser light generators. The term "generator" includes both oscillators and amplifiers. In an oscillator, rod 20 itself may be provided with reflective ends 30, 31 on core 22 (see FIG. 3). Or alternatively laser rod 20 may be positioned within an optically regenerative resonant cavity. In any embodiment it is important that the ends of the sensitizer element be essentially transmissive and that any oscillations produced within the laser material be restricted to the laserable core. To restrict oscillation solely to said laserable core, dichroic reflectors may be employed, said dichroics being reflective for the resulting stimulating emission of the laser ions and transmissive for the sensitizer ions emission. Alternatively, the Q of the sensitizer element can be kept low by grinding the ends of the sensitizer component. The term "Q" is intended to represent the ratio of wave energy storage to wave energy dissipation per unit cycle.

Accordingly, by providing a laser material with a sensitizer component containing neodymium ions and a laser component containing ytterbium ions the device is one which produces laser energy from the ytterbium ions at wavelengths shorter than 1.06 microns at approximately room temperature and lower.

We claim:

1. A trivalent ytterbium-doped laser device for emitting optical radiations at room temperature in a wave band centered at a wavelength shorter than 1.06 microns from the stimulated emission of trivalent ytterbium comprising two structurally separate components, the first component being a laser-active component and the second component being a sensitizer component, the laser-active component being doped with a laserable quantity of ytterbium ions and the sensitizer component being doped with a quantity of neodymium ions sufficient to absorb energy from a pump source and transfer this energy to ytterbium ions, said structurally separate components being disposed adjacent to each other to form said laserable material and to enable transfer of energy from the sensitizer component to the laser-active component.

2. The laser device as set forth in claim 1 wherein said sensitizer component has included therein ytterbium ions which ytterbium ions transfer energy from said sensitizer component to said laser-active component.

3. The laser device as set forth in claim 1 wherein said sensitizer component comprises a cladding enclosing said laser-active component.

4. The laser device as set forth in claim 3 wherein said laser-active component is a core of a laser rod.

5. The laser device as set forth in claim 1 wherein said sensitizer element comprises a number of optical fibers formed and longitudinally disposed within said laser-active component.

6. The laser device as set forth in claim 1 wherein said laser-active component and sensitizer component are glass slabs.